United States Patent [19]
Playe

[11] Patent Number: 4,607,269
[45] Date of Patent: Aug. 19, 1986

[54] ELECTROSTATIC PRINT HEAD

[75] Inventor: Patrice Playe, Houilles, France

[73] Assignee: Compagnie Industrielle des Telecommunications Cit-Alcatel, Paris, France

[21] Appl. No.: 758,584

[22] Filed: Jul. 25, 1985

Related U.S. Application Data

[63] Continuation-in-part of Ser. No. 482,083, Apr. 4, 1983, abandoned.

[30] Foreign Application Priority Data

Apr. 2, 1982 [FR] France ............................... 82 05725

[51] Int. Cl.[4] ....................... G01D 15/06; G01D 15/16
[52] U.S. Cl. ................................. 346/155; 346/139 C
[58] Field of Search ................... 346/139 C, 155, 74.5

[56] References Cited

U.S. PATENT DOCUMENTS 4,348,685 9/1982 Jaovannet et al. .................. 346/155
4,459,603 7/1984 Kimoto .............................. 346/155

*Primary Examiner*—E. A. Goldberg
*Assistant Examiner*—Linda M. Peco
*Attorney, Agent, or Firm*—Sughrue, Mion, Zinn, Macpeak and Seas

[57] ABSTRACT

A flexible printed circuit (1) has conductive tracks (2) each having one end constituting an electrode in a linear arrangement of electrodes. The back of the printed circuit in the vicinity of said arrangement of electrodes is pressed against a convex structure and an insulating film (3) covers printed circuit away from the electrodes in order to ensure a desired gap between the electrodes and the surface of a recording medium (11) pressed against the head. The head is particularly applicable to forming an electrostatic latent image which is subsequently transferred to some other recording medium.

7 Claims, 4 Drawing Figures

ELECTROSTATIC PRINT HEAD

This is a continuation of application Ser. No. 482,083, filed Apr. 4, 1983, now abandoned.

The present invention relates to electrostatically printing an image on a recording medium, and more particularly to an electrostatic print head having multiple electrodes which, when raised to high voltage, discharge electrically through the air, thereby creating a latent electrostatic image on a recording medium passing in front of the electrodes.

BACKGROUND OF THE INVENTION

This mode of printing therefore requires an air gap to be provided between the electrodes of the print head and the facing surface of the recording medium on which the latent image is formed. Thus, in order to form an image of electrostatic charge by means of a discharge through a gas, it is common practice not only to raise selected electrodes to a suitably high voltage, but also to provide a discharge gap of about 10 $\mu$m as a function of Paschen's law curves for discharge through the gas in question, namely air at atmospheric pressure.

When the recording medium is constituted by a conductive paper having a dielectric layer which is a few micrometers thick of one of its surfaces, the natural roughness of the paper or the use of spacer elements embedded in the dielectric layer serve to obtain said discharge gap between the electrodes and the dielectric surface. However, when the recording medium has a substantially perfectly smooth surface, which is particularly true of dielectric film or of a metal drum covered with a dielectric layer (either of which may be used as an intermediate medium on which a latent image is produced for subsequent transfer after development onto a final medium), it is necessary to provide means in the vicinity of the print head itself for ensuring the presence of said discharge gap.

French patent No. 2 138 789 describes a device for generating charge images in a geometrically restricted space for the reproductive portions of an arrangement of electrodes which are situated opposite to a very high resistance dielectric layer or information carrier. In one of the embodiments described in said patent, an arrangement of electrodes is formed by distinct conductive styluses, each of which is embedded in an electrically insulating substance which has hollows at said arrangement of electrodes which are of the same diameter as the styluses, and in a variant, the styluses are symbol-shaped and are embedded in insulating material with symbol-shaped hollows whereby the bottom of the electrode arrangement does not reach the bottom of the insulating material so that the hollows constitute the necessary discharge gap. In another embodiment described therein, an arrangement of electrodes is constituted by a thin, highly conductive layer covering the walls of holes or openings made in an insulating material, or in a variant, by shaped holes made in a conductive material; in both cases, the discharge inside the holes or openings enables charge images to be created.

However, these electrostatic heads designed to incorporate the necessary discharge gap are not easy to manufacture on an industrial scale. Further, they do not appear to be capable of being used for high-speed printing at high resolution (up to 8 points per millimeter) as is obtained with multielectrode electrostatic heads (1728 electrodes) currently being used with paper covered in a dielectric layer and having surface irregularities, which heads use printed circuit technology to define the electrodes as the end portions of conductive tracks.

In these types of electrostatic print heads using printed circuit technology, the end faces of the conductive tracks are level with, or even project beyond, the edge of the substrate on which the tracks are printed. Such print heads are commonly made with two rows of electrodes, either by assembling two printed circuit carrying substrates back-to-back, or by placing back-to-back the two parts of a single substrate which has been folded or cut. Nonetheless, such heads will not operate with recording surfaces having a surface state which is too smooth.

Preferred embodiments of the present invention provide a print head in which an electric discharge gap is provided around the electrodes so that the head can operate with a recording medium having a smooth surface state, said head being made in printed circuit technology to define a linear arrangement of electrodes compatible with very high print performance.

Preferred embodiments of the present invention also keep the distance between each of the electrodes and the recording medium constant, independently of defects which would normally cause said distance to vary.

SUMMARY OF THE INVENTION

The present invention provides an electrostatic print head for electrostatic printing on a recording medium having a substantially smooth surface, wherein the head comprises a plurality of electrodes constituted by end portions of conductive tracks on a flexible printed circuit, said printed circuit being mounted, at least in the vicinity of the electrodes and the adjacent portions of the tracks, with its back pressed against a convex support structure, and having its outer face covered, except for said end portions of the conductive tracks, by an insulating film of suitable thickness to ensure that when the film adjacent to the electrodes is pressed against the recording medium, the thickness of the film keeps the said electrodes at a desired distance from the recording medium.

Such a head is thus particularly applicable to industrial scale manufacture of print heads having high printing performance on a recording medium having a smooth surface state, such as a metal drum covered in a thin dielectric layer, or a dielectric tape passing over a metal roller which serves as a counter-electrode.

Preferably the structure carrying the printed circuit (or if the recording medium is a dielectric tape, the metal roller over which the recording medium passes), is made of resilient material and is subjected to pressure means for maintaining the recording medium and the insulating film pressed against each other.

Under such conditions, the resilient material deforms to compensate for any imperfections in the machining of the metal drum of the recording medium or of the thrust roller over which the recording medium passes.

BRIEF DESCRIPTION OF THE DRAWINGS

An embodiment of the invention is described by way of example with reference to the accompanying drawings, in which.

MORE DETAILED DESCRIPTION

Figure 1:
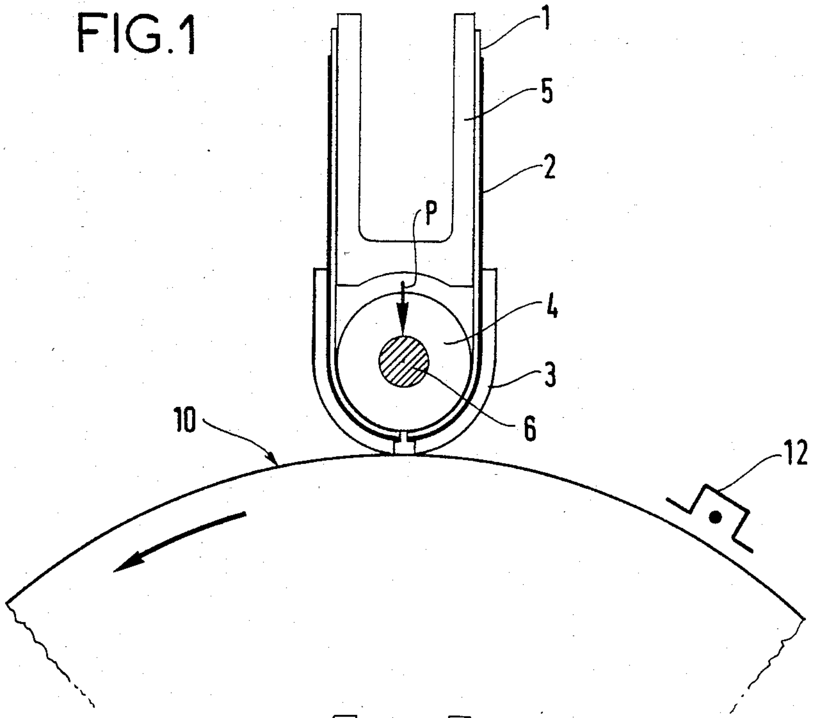
FIGS. 1 and 2 are schematic elevation views of an electrostatic print head in accordance with the invention, for printing electrostatic latent images respectively on a drum covered in dielectric material and on a strip of dielectric material.
Figure 2:
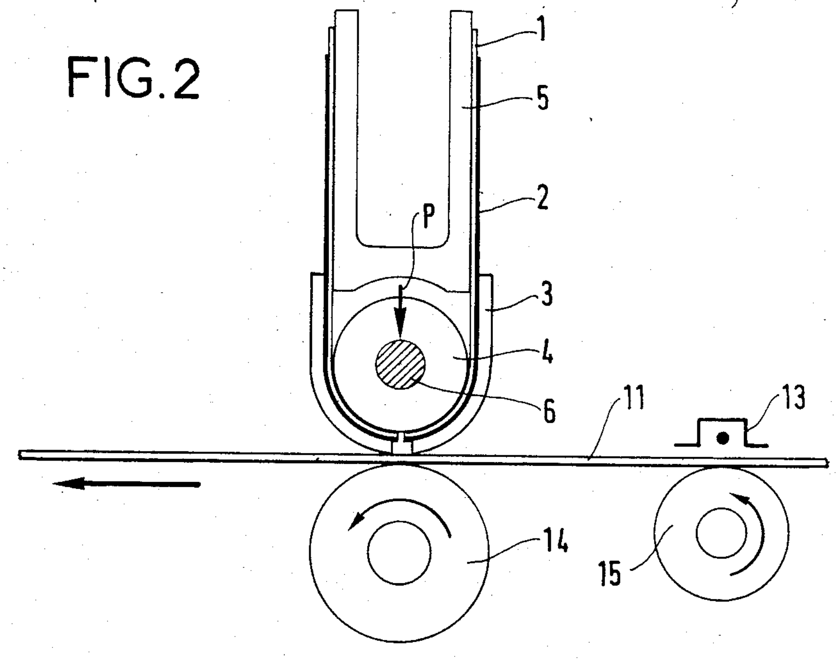

With reference to FIGS. 1 and 2, it can be seen that an electrostatic print head comprises a flexible printed circuit 1 having conductive tracks such as 2 printed on one of the faces of a flexible substrate. The tracks are organized in two distinct networks having facing terminal portions aligned in two parallel rows and constituting the print electrodes (no reference numerals in these two figures). The head further comprises an insulating film 3 which is 10 to 20 μm thick and which covers the printed face of the circuit 1, except that the gap between the two rows of electrodes and the terminal portions of the tracks which constitute the electrodes are left uncovered. Advantageously, the film 3 is made of two portions which are applied identically to respective ones of the networks of conducting tracks.

The rear face of the printed circuit 1 is pressed against a support structure in the form of a drum 4 in such a manner that the rows of electrodes on the outer face of the printed circuit are disposed substantially along two generator lines of the drum. The drum 4 is advantageously of small diameter, in the region of one to a few centimeters, so that the head is narrow, and also so that the profile of the head near the electrodes is highly convex and optionally deformable, depending on the material chosen for manufacturing the drum.

The drum 4 is associated with an auxiliary support structure shown in this instance as being in the form of a channel section support 5. The flanges of the support 5 receive respective side portions of the printed circuit 1 situated on either side of its mid portion which is held pressed against the drum. The side portions of the printed circuit include the other ends of the conductive tracks for connection to an electrode control circuit which is not shown or described since it is irrelevant to the problem of the present invention. The channel section support may be fixed to a shaft 6 of the drum 4. The printed circuit may be fixed to the drum 4 and to the support 5 by means of glue or of a film of adhesive polyester.

Figure 3:
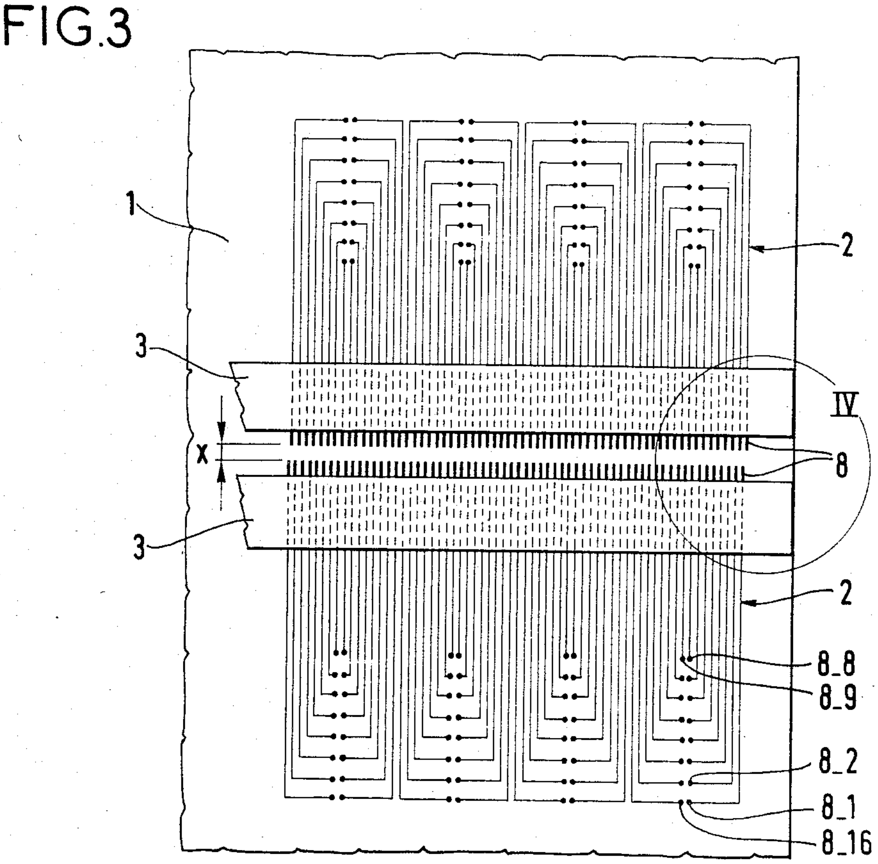
FIG. 3 is a schematic plan view of the components of the print head.
Figure 4:
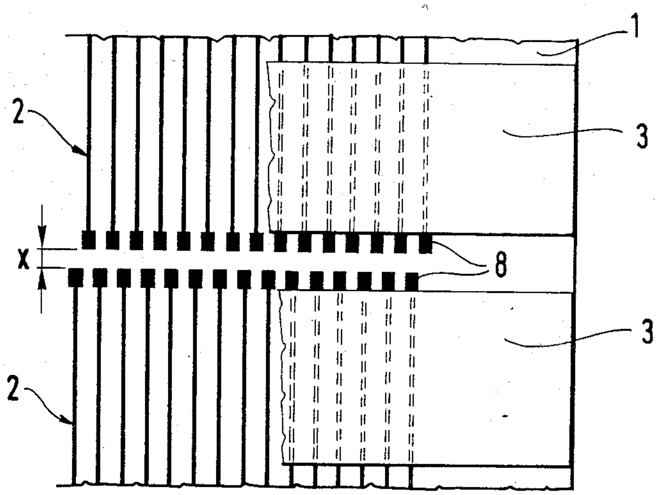
FIG. 4 shows a portion marked IV of FIG. 3, but to a larger scale.

With reference to FIGS. 3 and 4 which are diagrams showing how the conductive tracks 2 are arranged on the substrate of the printed circuit, it can be seen that the tracks are organized as two distinct networks which terminate in a longitudinal mid portion of the printed circuit, with the two networks ending in two parallel rows which are separated from each other by a distance x which is equal to one or more printing lines. The terminal portions of the tracks 2 constituting said rows and left uncovered by the insulating film 3 which is placed over the printed face of the circuit 1. constitute the electrodes 8 of the print head. The size of the dots printed is thus determined in one direction by said portions which are not covered by the insulating film. Regardless of the organization of the tracks 2, the electrodes 8 are regularly spaced along their rows, and the rows are staggered relative to each other by half the spacing between electrodes.

The tracks 2 lead away from the electrodes 8 in each of the rows towards opposite sides of the printed circuit 1 to terminate in terminals which are grouped together in pairs of parallel lines extending at right angles to the rows of electrodes in order to facilitate connection to the electrode control circuits. Thus, with reference to FIG. 3, it can be seen that the conductive tracks are organized in groups of sixteen and that the connection terminals in each group and referenced 8-1, . . . , 8-8, 8-9, . . . 8-16 in one of the groups, are indeed arranged in two parallel lines at right angles to the rows of electrodes. Further, the terminals are advantage-equally spaced and facing one another in pairs as illustrated, or staggered (not illustrated). The portions of the printed circuits which include these connection terminals, or at least the terminals themselves are not covered by the insulating film 3.

Naturally, in practice, the grouping of the conductive tracks could be different, depending on the number of electrodes in the head (e.g. 1728 electrodes), the control circuit to be associated with the head, and the connection facilities provided for connecting the control circuit to the terminals at the ends of the tracks.

In a print head in accordance with the invention, in which the printed circuit is mounted on a convex surface, the electrodes are constituted by the entire area of the end portions of the tracks, rather than by their end edges. The size of said electrodes is therefore limited by the size of dot which it is desired to print. This size affects both the width of the electrode-forming portions of track, and also the lengths of portions left uncovered by suitably positioning the insulating films 3.

Further, in a print head, the extra thickness of the insulating film 3 standing on either side of the electrodes constitutes a bearing surface via which the print head presses against the recording medium, thereby keeping the electrodes spaced apart from the medium and maintaining a suitable discharge gap between the electrodes and the medium as required for generating latent images, even if the surface of the medium is very smooth.

The description of a print head in accordance with the invention continues with reference to FIGS. 1 and 2 showing two different kinds of medium which can be used with the head. FIG. 1 shows a metal drum 10 covered with a dielectric layer and having its axis parallel to the axis of the head drum 4, while FIG. 2 shows a dielectric film 11 having a relatively smooth surface.

In FIG. 1, the periphery of the dielectric covered drum 10 passes in front of the two rows of electrodes in the print head with the insulating film 3 bearing against the dielectric layer of the drum. A corona wire 12 is placed to charge the drum electrostatically before the drum passes next to the head. The latent image is then written by applying suitable voltages to the metal drum and to selected ones of the electrodes to cause a discharge of ions through the layer of air between the electrodes and the dielectric layer. The thickness of this layer of air is normally defined by the thickness of the insulating layer 3 to lie in the range 10 μm to 20 μm.

When the print head is used with such a medium, the print head supporting drum 4 is advantageously made of resilient material and is pressed against the recording medium by a pressure P, of about 1 kg for example, applied to the shaft 6.

Under such conditions the print head is flexible enough to be uniformly applied against the rigid drum 10 and to match the shape of its periphery. This arrangement overcomes any small defects there may be in the machining of the surface of the recording drum 10 which could otherwise cause variations in the thickness of the layer of air between the electrodes and the facing dielectric layer by compressing the print head to compensate for surface irregularities in the drum, thereby maintaining each electrode at a constant distance from the periphery of the printing drum.

In FIG. 2, the film of dielectric material 11 which is electrostatically charged by a corona wire 13 mounted opposite a metal guide 15, is driven past the print head while being supported opposite the print head by a conductive roller 14 which serves as a counter-electrode for the print head.

In such a case where the print head is used with a flexible recording medium, the print head supporting drum 4 should likewise be made of flexible material and should be pressed with pressure P against the periphery of the conductive roller 14 which may be rigid and fixed, or alternatively and as shown, the roller 14 may be deformable and pressed against the drum 4 which is then rigid and fixed relative thereto.

These conditions give the same advantage of positioning the electrodes at a constant distance from the flexible recording medium independently of any defects in the machining of the drum 4 or the roller 14.

I claim:

1. An electrostatic print head for electrostatic printing on a recording medium having a substantially smooth surface, the improvement wherein said head comprises:

a printed circuit including a flexible substrate having opposite front and back surfaces, two sets of parallel rows of printed circuit conductive tracks on said front surface of said flexible substrate including terminal parts and defining terminal part ends facing each other and spaced from each other, forming air gaps therebetween and defining a plurality of electrodes separated by said gaps, a convex support structure, said flexible substrate being mounted, at least in the vicinity of said electrodes and adjacent portions of said tracks, with its back surface pressed against said convex support structure, and an insulating film covering the front of said flexible substrate and portions of said two sets of parallel rows of said conductive tracks except for said terminal parts, said film including a gap aligned with the gaps of said printed circuit conductive tracks, and wherein said insulating film is of suitable thickness to ensure that when the film adjacent to the electrodes in the vicinity of said gaps is pressed against the recording medium, the thickness of the film keeps said electrodes at a desired distance from the recording medium to define a linear arrangement of electrodes compatible with very high print performance.

2. An electrostatic print head according to claim 1, wherein the said electrodes are arranged at the same spacing in two rows which are separated from each other by n printing lines where n is a small integer not less than unity, with the electrodes in the two rows being staggered relative to one another, said printed circuit conductive tracks being divided into two printed portions which face one another, which are separated from one another by n printing lines, and which are staggered relative to each other by one half of the pitch of the electrodes in each of the rows.

3. An electrostatic print head according to claim 2, wherein the insulating film is constituted by two portions mounted on said printed circuit flexible substrate and separated by $n+2$ printing lines so as to leave the two rows of electrodes uncovered together with the space in between them.

4. An electrostatic print head according to claim 2, wherein the conductive tracks are arranged in groups, and their end portions opposite to the end portions constituting the electrodes are arranged in groups, each comprising a pair of lines arranged at right angles to the rows of electrodes.

5. An electrostatic print head for electrostatic printing on a recording medium having a substantially smooth surface, the improvement wherein said head comprises:

a printed circuit including a flexible substrate having opposite front and back surfaces, two sets of parallel rows of printed circuit conductive tracks on said front surface of said flexible substrate including terminal parts and defining terminal part ends facing each other and spaced from each other, forming air gaps therebetween and defining a plurality of electrodes separated by said gaps, a convex support structure, said flexible substrate being mounted, at least in the vicinity of said electrodes and adjacent portions of said tracks, with its back surface pressed against said convex support structure, and an insulating film covering the front of said flexible substrate and portions of said two sets of parallel rows of said conductive tracks except for said terminal parts, said film including a gap aligned with the gaps of said printed circuit conductive tracks, and wherein said insulating film is of suitable thickness to ensure that when the film adjacent to the electrodes in the vicinity of said gaps is pressed against the recording medium, the thickness of the film keeps said electrodes at a desired distance from the recording medium to define a linear arrangement of electrodes compatible with very high print performance, and wherein said convex support structure is a drum made of resilient material on which said electrodes are arranged in a linear arrangement parallel to the axis of the drum.

6. An electrostatic print head according to claim 5, further comprising means for applying pressure to said drum for pressing said insulating films, and said recording medium against each other.

7. An electrostatic print head for electrostatic printing on a recording medium having a substantially smooth surface, the improvement wherein said head comprises:

a printed circuit including a flexible substrate having opposite front and back surfaces, two sets of parallel rows of printed circuit conductive tracks on said front surface of said flexible substrate including terminal parts and defining terminal part ends facing each other and spaced from each other, forming air gaps therebetween and defining a plurality of electrodes separated by said gaps, a convex support structure, said flexible substrate being mounted, at least in the vicinity of said electrodes and adjacent portions of said tracks, with its back surface pressed against said convex support structure, and an insulating film covering the front of said flexible substrate and portions of said two sets of parallel rows of said conductive tracks except for said terminal parts, said film including a gap aligned with the gaps of said printed circuit conductive tracks, and wherein said insulating film is of suitable thickness to ensure that when the film adjacent to the electrodes in the vicinity of said gaps is pressed against the recording medium, the thickness of the film keeps said electrodes at a desired distance from the recording medium to define a linear arrangement of electrodes compatible with very high print performance, and wherein an electrically conductive structure faces said electrodes and over which there passes said recording medium in the form of a dielectric strip, and wherein at least one of the structures which respectively carry said printed circuit conductive tracks and said recording medium is made of a resilient material and said head comprises means for subjecting at least one of said structures to a pressure P applying said insulating films and said recording medium against each other.

* * * * *